United States Patent [19]

Bertelli et al.

[11] 4,033,915
[45] July 5, 1977

[54] FLAME-EXTINGUISHING POLYOLEFIN COMPOSITIONS

[75] Inventors: Guido Bertelli; Pierpaolo Roma, both of Ferrara; Paolo Longi, Milan, all of Italy

[73] Assignee: Montedison S.p.A., Milan, Italy

[22] Filed: July 22, 1975

[21] Appl. No.: 598,123

[30] Foreign Application Priority Data

Aug. 2, 1974 Italy ............................. 25928/74

[52] U.S. Cl. ............... 260/28.5 A; 260/45.75 B; 260/45.75 K; 260/2 M; 260/896; 260/897 C; 260/447; 260/446

[51] Int. Cl.² ..................... C08K 5/56; C08K 5/00

[58] Field of Search .............. 260/45.75 B, 45.75, 260/28.5 A, 896, 446, 447, 2 M, 897; 424/83, 288, 296

[56] References Cited

UNITED STATES PATENTS

| | | | |
|---|---|---|---|
| 2,242,224 | 5/1941 | Bley | 260/446 |
| 2,314,466 | 3/1943 | Thwaites | 260/45.75 B |
| 2,664,411 | 12/1953 | Cooper | 260/45.75 B |
| 2,801,988 | 8/1957 | Fischer et al. | 260/45.75 B |
| 3,054,760 | 9/1962 | Worsley et al. | 260/446 |
| 3,207,720 | 9/1965 | Safford | 260/45.75 B |
| 3,239,482 | 3/1966 | Rapp | 260/45.75 B |
| 3,247,050 | 4/1966 | Leebrick | 424/296 |
| 3,247,051 | 4/1966 | Leebrick | 424/296 |
| 3,374,200 | 3/1968 | Deichert | 260/45.75 E |
| 3,382,209 | 5/1968 | Deichert | 260/45.75 E |
| 3,418,263 | 12/1968 | Hindersinn et al. | 260/45.75 |
| 3,549,409 | 12/1970 | Dyck | 428/474 |
| 3,558,783 | 1/1971 | Leebrick et al. | 424/296 |
| 3,640,949 | 2/1972 | Dalzell | 260/45.75 B |
| 3,862,326 | 1/1975 | Gross | 424/296 |

*Primary Examiner*—V. P. Hoke
*Attorney, Agent, or Firm*—Morgan, Finnegan, Pine, Foley & Lee

[57] ABSTRACT

This invention relates to new flame-extinguishing agents for polymers and to self-extinguishing compositions based on polymers or copolymers of ethylene and of alpha-olefins and containing the above-mentioned flame-extinguishing agents.

6 Claims, No Drawings

FLAME-EXTINGUISHING POLYOLEFIN COMPOSITIONS

BACKGROUND OF THE INVENTION

Various processes useful to render the polymers flameproof are already known from the Art; these processes essentially consist in adding to the polymers thermally unstable halogenated compounds that decompose in consequence of heat under formation of hydrochloric or hydrobromic acid.

Some examples of such halogenated compounds are chlorinated paraffin waxes containing 40 to 75% of chlorine, and chlorinated or brominated phenols.

When halogenated compounds of the type of the aforesaid chlorinated paraffin waxes or of the type of the chlorinated or brominated phenols are added to polyethylene or polypropylene, the polymer combustibility undergoes a reduction that depends on the amount of halogen present in the polymer. To attain a satisfactory uninflammability degree, however, very high amounts of halogenated compounds, generally higher than 30% by weight with respect to the polymer, are required.

It is known how to reduce the amount of halogenated additive by introducing also an oxygen containing antimony compound of the type of trioxide or of antimony oxyhalides into the polymers.

Although the antimony trioxide + halogenated paraffin compounds yield satisfactory results as regards the self-extinguishing properties, they are not free very serious drawbacks. When antimony trioxide is used as a flame-extinguishing agent, it is usually added to the polymer in an amount higher than 10% by weight and halogenated paraffin as a flame-extinguishing agent is generally in an amount of 15–30% by weight, so that the total additive amount (antimony compound + halogenated paraffin) is generally between 30 and 35% by weight with respect to the polymer. This brings about a strong deterioration of the polymer's mechanical properties (tensile strength, yield strength, hardness, resilience), a corrosion of the equipments in which the treatment is carried out and, finally, a strong evolvement of toxic smokes and gases in case of fire.

We have now surprisingly found particular flame-extinguishing agents for polymers and especially for polyolefins that reduce many of the drawbacks of the presently used flame-extinguishing agents mentioned above, particularly with respect to the total amount of additive required.

GENERAL DESCRIPTION OF THE INVENTION

The flame-extinguishing agents according to this invention consist of the product of the reaction between a compound having formula $MR_mX_n$, in which M is bismuth, antimony or tin; R is selected from the group consisting of alkyl, a cycloalkyl, an aryl, an alkaryl having up to 20 carbon atoms and the $-OR^1$, wherein $R^1$ has a molecular weight up to 400 and is selected from the group consisting of hydrocarbon groups and hydrocarbon groups containing ether oxygen atoms; X is chlorine or bromine; m and n are zero or integers from 1 to 5, the sum $m + n$ being equal to the valency of M, and a compound selected from amongst the following ones;

a. a polymeric or non-polymeric hydrocarbon compound, either saturated or unsaturated, containing more than 6 carbon atoms;

b. a polymeric or non-polymeric partially halogenated compound, thermally unstable, that decomposes in consequence of heat, thus forming the corresponding hydrogen halide.

Hydrocarbon compound (a) may be the same thermoplastic polymer intended to become self-extinguishing, such as, for example, a polymer of ethylene or of an alpha-olefin or an ethylene/alphaolefin elastomreric copolymer or a polydiene, or a linear or cyclic hydrocarbon, either saturated or not, having 7 to 50, preferably 10 to 25, carbon atoms. Some examples of these non-polymeric compounds are paraffin waxes, hydrocarbons having at least one double bond, such as alpha-olefins, di- or multiolefins containing 10 to 20 carbon atoms, cyclic hydrocarbons such as naphthalene, anthracene, durene, diphenyl, cyclodecane, cyclododecane and the like.

Amongst the partially halogenated compounds specified under (b), the following may be named: chlorinated paraffin waxes containing 40 to 75% by weight of chlorine, chlorinated propylene, chlorinated naphthalenes, chlorinated indenes, chlorinated polyphenyls such as chlorinated terphenyl, tetrachlorophthalic anhydride, chlorinated polyphenols such as tetrachlorinated bisphenol A, chlorinated polymers such as polyvinyl chloride, polyvinylidene chloride, chlorinated polyester resins and chlorinated rubbers.

Some representative compounds falling under formula $MR_mX_n$ are the following: $BiCL_3$, $BiCL_5$, $C_2H_5BiCl_2$, $Bi(C_2H_5)_3$, $Bi(OCH_3)_3$, Bi polyethyleneglycolate, $SbCL_3$, $SbCl_5$, $SbBr_3$, $Sb(CH_3)_3$, $(C_2H_5)_2SbCl$, $C_2H_5SbBr_2$, $Sb(OC_2H_5)_3$, $SnCL_4$, $SnBr_4$, $(C_2H_5)_2SnCl_2$.

The compounds yielding the best results are those of bismuth in the case of polypropylene and those of antimony in the case of polyethylene.

The flame-extinguishing agents of the present invention may be prepared by:

1. reacting the metal compound with a hydrocarbon polymer, in dry conditions, at a temperature ranging from 70° to 250° C., or with a non-polymeric hydrocarbon containing more than 6 carbon atoms, at a temperature comprised between 70° and 250° C. in a suitable organic solvent (acetone, carbon disulphide, chlorinated hydrocarbons, ethers);

2. reacting the metal compound with a partially halogenated compound as specified under (b) hereinbefore, at a temperature comprised between 70° and 150° C. in one of the above-cited solvents employable in the reaction between metal compound and non-polymeric hydrocarbon.

These reactions, likely, bring about groups such as

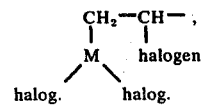

that render the reaction product very corrosive. Accordingly, it is desirable to hydrolyze all the ionic chlorine according to the known techniques, for instance by repeatedly washing it with an aqueous solution of NaOH.

When the metal compound is reacted with a non-polymeric hydrocarbon, the latter shall have a relatively high number of carbon atoms (from 7 to 50, preferably from 10 to 25), since too light a hydrocarbon would provide, owing to reaction with the metal compound, compounds rather volatile at the molding temperature of the final product. Some examples of hydrocarbons exployable in this method alternative are: pentadecane, pentadecenes and pentadecadienes, hexadecane, hexadecenes and hexadecadienes, octadecane, octadecenes, octadeca-dienes and -trienes, eicosane, eicosenes, eicosa-dienes, -trienes and -tetraenes, all these hydrocarbons being either linear or ramified. Amongst the useful cycloaliphatic hydrocarbons the following may be cited: decahydronaphthalene, alkyl-substituted decahydronaphthalenes, thoroughly hydrogenated phenanthrene and anthracene.

The flame-extinguishing agents of this invention, when prepared by reacting the metal compound with a hydrocarbon compound as specified under (a) hereinbefore, are preferably added to the polymers along with a partially halogenated thermally unstable compound of the type indicated under (b), such as chlorinated paraffin waxes at 70–75% of chlorine, chlorinated or brominated polyphenols such as, for example, tetra-chlorinated bisphenol A.

When the flame-extinguishing agent is prepared by reaction of the metal compound with the partially halogenated compound specified under (b), it is not necessary to add also chlorinated or brominated compounds of the type specified under (b) to the polymer, since in this case the flame-extinguishing agent imparts by itself high extinguishment values.

The new flame-extinguishing agents are particularly suited to prepare self-extinguishing polyolefin compositions.

The self-extinguishing composition forming the object of this invention are made up of:
A. 100 parts of a polymer or copolmer of ethylene and/or alpha-olefins, in particular high and low density polyethylene, predominantly isotactic polypropylene, optionally modified with small amounts of polymerized ethylene, and ethylene-propylene elastomeric copolymers;
B. a flame-extinguishing agent of this invention in such amount as to have a metal content in said polymer comprised between 0.5 and 5% by weight;
C. 0 to 10 parts of a partially chlorinated or brominated compound, thermally unstable and capable of decomposing when subjected to heating, thus giving place to hydrochloric or hydrobromic acid.

As already pointed out hereinbefore, when the flame-extinguishing agent is obtained by reacting the metal compound with a partially halogenated compound as per point (b) as described hereinbefore, the addition of components (C) becomes superfluous, since in this case the flame-extinguishing agent permits, even by itself, to reach good self-extinguishment degree. Conversely, the addition of component (C) is suitable when the flame-extinguishing agent is prepared by reaction of the metal compound with a compound of hydrocarbon nature; in such case component (C) is employed in amounts of 1 to 10%, preferably of 3 to 6% by weight with respect to the olefin polymer.

To prepare the polyolefin compositions of this invention, besides adding –M according to the known technologies — the previously prepared flame-extinguishing agent to the polyolefin, it is possible to react, in dry conditions, the polyolefin to be rendered self-extinguishing, with the metal compound at a temperature ranging from 70° to 150° C. and then to add to the reaction product after hydrolysis a thermally unstable chlorinated or brominated compound, in particular a halogenated paraffin of the type of CERECLOR 70. CERECLOR 70 is a Trademeark for a chlorinated paraffin wax containing 70% Cl and sold by Imperial Chemical Industries Ltd. Instead of reacting the whole polyolefin with the metal compound, it is sometimes advisable to react only a part of same, or a certain amount of another polyolefin, with the metal compound, thus obtaining a masterbatch to be added, after hydrolysis, to the not treated polyolefin along with the halogenated paraffin.

SPECIFIC DESCRIPTION OF THE INVENTION

The following examples are given to better illustrate the present industrial invention, without being however a limitation thereof.

EXAMPLE 1

200 g of polyproplene (isotaciticty index = 95) or of high density polyethylene and 6 g of $BiCl_3$ or 4.3 g of $SbCl_3$ were introduced into a 1 liter flask of a rotary evaporator. The flask was caused to rotate at low speed while conveying thereinto a nitrogen flow; after about ten minutes the reaction flask was heated in an oil bath up to a temperature of 120° C. in the case of polypropylene, the reaction being conducted for 60 minutes, and up to 100° C. in the case of polyethylene, the reaction being conducted for 120 minutes.

On completion of the reaction the polymer was treated with a 0.01 N solution of NaOH in the presence of an anionic surfactant and then washed with water to neutrality.

The resulting product was filtered and dried in an oven at 50° C. under a residual pressure of 400 mm of Hg for 48 hours. 204 g of product were thus obtained. Table 1 shows the results relating to polyethylene and polypropylene treated with antimony or bismuth chlorides for different reaction times. As it may be noticed, the modification is very effective, by itself, in slowing down the thermal decomposition of the polymer (weight loss). Furthermore, it may be observed that excellent degrees of self-extinguishing power (oxygen index) can be achieved by adding the samples with 5% by weight of Cereclor 70.

The treatment with bismuth results more effective than that with antimony in the case of polypropylene and vice-versa in the case of polyethylene.

Table 2 shows — for comparative purposes — the results obtained by adding flame-extinguishing agents of the known type, such as antimony and bismuth oxides and oxychlorides, to the polymers.

As one may notice, the metal content being equal, both the oxides and the oxychlorides yield rather bad results.

Finally, table 3 shows that also other halogenated organic compounds are capable of yielding good results provided they are added to a polymer previously treated with $BiCl_3$.

TABLE 1

| Polyethylene | Treatment time in minutes | Content in the polymer Sb% | Cl% | Weight loss % at 400°C. | Oxygen index (OI) (**) |
|---|---|---|---|---|---|
| PE TQ | — | — | — | 25% | 18.5 |
| PE TR-1 | 30 | 0.21 | 0.06 | 20% | 21 |
| PE TR-2 | 60 | 0.58 | 0.13 | 6% | 23.5 |
| PE TR-3 | 120 | 1.21 | 0.31 | 0 | 27 |

TABLE 1-continued

| | Bi% | Cl% | at 400°C. | Oxygen index (**) |
|---|---|---|---|---|
| PE TQ | — | — | 25% | 18.5 |
| PE TR-4 | 30 | 0.52 | 0.10 | 18% | 20.5 |
| PE TR-5 | 60 | 0.78 | 0.14 | 7% | 21.5 |
| PE TR-6 | 120 | 1.2 | 0.28 | 3% | 22.5 |

| Polypropylene | Treatment time in minutes | Content in the polymer Sb% | Cl% | Weight loss % at 350°C. | Oxygen index (**) |
|---|---|---|---|---|---|
| PP TQ | — | — | — | 25% | 17.5 |
| PP TR-I | 20 | 0.24 | 0.13 | 9% | 20.5 |
| PP TR-II | 30 | 0.55 | 0.20 | 5% | 23 |
| PP TR-III | 60 | 1.1 | 0.30 | 3% | 25 |

| | | Bi% | Cl% | at 350°C. | Oxygen index (**) |
|---|---|---|---|---|---|
| PP TQ | — | — | — | 25% | 17.5 |
| PP TR-IV | 20 | 0.40 | 0.11 | 17% | 24 |
| PP TR-V | 30 | 0.74 | 0.13 | 12% | 28 |
| PP TR-VI | 60 | 0.16 | 0.23 | 8% | 29 |

TQ = as such
TR = as treated
(**) After addition of 5% by weight of Cereclor 70 (chlorinated paraffin produced by I.C.I.). Oxygen index (ASTM D - 2863) = minimum percentage of oxygen, in an oxygen/nitrogen mixture, necessary for the sample to burn continuously.

TABLE 2

| Formulation | Oxygen index | Notes |
|---|---|---|
| PE + 5%CER-70 | 18.5 | — |
| PE + 5%CER-70 + 1, 5%Sb$_2$O$_3$ | 24.5 | — |
| PE + 5%CER-70 + 1, 6%Sb$_4$O$_5$Cl$_2$ | 20.5 | Corrosive |
| PP + 5%CER-70 | 17.5 | — |
| PP + 5%CER-70 + 1, 5%Sb$_2$O$_3$ | 22 | — |
| PP + 5%CER-70 + 1, 6%Sb$_4$O$_5$Cl$_2$ | 19 | Corrosive |
| PE + 5%CER-70 + 1, 35%Bi$_2$O$_3$ | 20.5 | — |
| PE + 5%CER-70 + 1, 5%BiOCl | 21.5 | Corrosive |
| PP + 5%CER-70 + 1, 35%Bi$_2$O$_3$ | 22 | — |
| PP + 5%CER-70 + 1, 5%BiOCl | 20.5 | Corrosive |

TABLE 3

| Polymer | Halogenated compound (5% by weight) | Oxygen Index |
|---|---|---|
| PP TR ( ) | Cereclor 70 (.) | 27.5 |
| PP TQ | Cereclor 70 | 17.5 |
| PP TR ( ) | Flammex 5 BT (*) | 27 |
| PP TQ | Flammex 5 BT | 18.5 |
| PP TR ( ) | Dibromopropyldian (°) | 28 |
| PP TQ | Dibromopropyldian | 20.5 |

( ) Polypropylene treated with bismuth trichloride (Bi - 1.5% by weight; Cl - 0.15% by weight);
(.) Cereclor 70 (I.C.I.) = chlorinated paraffin (70% of Cl);
(*) Flammex 5 BT (Berk) = brominated aromatic compound (82% of Br);
(°) Dibromopropyldian (Chemische Fabrik Kalk) (66% of Br).

EXAMPLE 2

In a three-neck flash having 1 liter capacity, 60 g (0.19 moles) of anhydrous BiCl$_3$ and 100 g of a mixture of alpha-olefins C15–C18 (this amount being about twice the equimolecular amount) were dissolved in 300 cm$^3$ of acetone and were heated to boiling, under intense stirring. The reaction had to be conducted for at least 48 hours, whereupon about 700 cm$^3$ of H$_2$O were gradually admixed. It was stirred for further 3 hours at room temperature, then it was filtered and repeatedly washed with H$_2$O until neutral reaction of the filtrate; subsequently it was washed with acetone and dried, thus obtaining 90 g of a white product in powder.

Analysis: Cl = 10.7%; Bi = 68.5%.

By operating in an analogous manner, SbCl$_3$ and SnCl$_4$ were reacted with alpha-olefins.

Analysis: Cl = 9.1%, Sb = 63.2%; Cl = 5.3%, Sn = 60.0% respectively.

By adding different amounts of these reaction products to polypropylene, in the presence and in the absence of Cereclor 70 (CER-70), the results reported on Table 4 were obtained.

TABLE 4

| Formulation | Weight loss % at 350° C. | Oxygen Index |
|---|---|---|
| PP | 25 | 17 |
| PP + 5% CER-70 | 14 | 17.5 |
| PP + 3% olefin/Sb (.) | 5 | 18.5 |
| PP + 5% CER-70 + 3% olefin/Sb (.) | 7 | 25 |
| PP + 3% olefin/Bi (*) | 7 | 19.5 |
| PP + 5% CER-70 + 3% olefin/Bi (*) | 8 | 29 |
| PP + 3% olefin/Sn (°) | 10 | 18.5 |
| PP + 5% CER-70 + 3% olefin/Sn (°) | 12.1 | 23 |

(.) Product obtained from the reaction between antimony trichloride and an alpha-olefin C15 – C18.
(*) Product obtained from the reaction between bismuth trichloride and an alpha-olefin C15 – C18.
(°) Product obtained from the reaction between stannic chloride and an alpha-olefin C15 – C18.

EXAMPLE 3

20 g of BiCl$_3$ were dissolved in 100 cm$^3$ of acetone, and the resulting solution was poured into the flask of a rotary evaporator along with about 100 g of a halogenated organic compound as indicated in table 5. The solvent was first evaporated at 60 to 70° C., then the oil bath was brought to 120° C. and rotation was conducted for about 30 minutes. The powder was allowed to cool down to 50° C., 100 cm$^3$ of acetone were added once more; then a normal solution of NaOH was admixed dropwise until thorough precipitation of the reaction product.

It was filtered, washed with water to neutrality and then repeatedly with methanol. It was dried in an oven under vacuum at a temperature of 60° C., whereupon 80 g of product were obtained.

Table 5 shows the results attained by adding to polypropylene 5% by weight of some products obtained according to the method illustrated hereinbefore, while employing different halogenated organic compounds.

TABLE 5

| Formulation | Oxygen Index |
|---|---|
| PP + 5% CER-70/Bi (.) | 29 |
| PP + 5% DBPD/Bi (*) | 27.5 |
| PP + 5% FLAMMEX 5 BT/Bi (°) | 25.5 |

(.) Product obtained from the reaction of Cereclor 70 with BiCl$_3$ in a ratio by weight of 5:1.
(*) Product obtained from the reaction of dibromopropyldian with BiCl$_3$ in a ratio by weight of 5:1.
(°) Product obtained from the reaction of Flammex 5BT with BiCl$_3$ in a ratio by weight of 5:1.

EXAMPLE 4

90 g of polypropylene in powder having a particle size lower than 300 meshes/cm$^2$ were mixed with 30 g (0.1 moles) of BiCl$_3$ dissolved in 100 cm$^3$ of acetone.

All the solvent was evaporated at 30–40° C. under vacuum until a finely subdivided powder was obtained again.

This powder was introduced into the flask of a rotary evaporator and heated for 30 minutes at 120° C.; it was cooled down to 90–100° C., whereupon 90 g of Cereclor 70 were added, the whole being allowed to rotate for further 60 minutes.

After cooling, 250 cm$^3$ of a 1:1 (by volume) mixture of 0.1 N NaOH and methanol were added; it was filtered and washed with $H_2O$ to neutrality of the filtrate.

The product was washed 2-3 times with the methanol and then dried in an oven under vacuum at 70-80° C. 190 g of a powder having a Bi content of 10.8% were thus obtained.

Analogously a reaction product of $SbCl_3$ with polyethylene was prepared. Sb content = 9.8%.

Table 6 shows the results obtained by using masters of this type in admixture with polypropylene and polyethylene.

TABLE 6

| Formulation | % by weight | % by weight |
| --- | --- | --- |
| PP | 90 | — |
| PE | — | 90 |
| PP masterbatch (Bi) | 10 | — |
| PE masterbatch (Sb) | — | 10 |
| Oxygen Index | 28.5 | 29 |

EXAMPLE 5

200 g of polyethylene glycol (Carbowax 200 of Messrs. CHEMPLAST, having a molecular weight equal to 200) were gradually added, under stirring, to a suspension of 40 g of metal sodium in 300 cm³ of n-heptane.

It was heated at reflux for a few hours and the oily precipitate was separated, by means of a separatory funnel, from the above-lying heptane layer.

35 g of the precipitate, dissolved in 100 cm³ of acetone, were then admixed to 15 g of $BiCl_3$ dissolved in 100 cm³ of acetone.

The resulting white precipitate was filtered, washed with acetone, subsequently with water, again with acetone and finally dried at 50° C. under reduced pressure.

Analysis: Bi = 62.5%.

By adding 3% by weight of this substance (bismuth polyethylene glycolate) and then 5% of Cereclor 70 to polypropylene (at about 200° C.) a material exhibiting an oxygen index = 25.5 was obtained.

EXAMPLE 6

3 g of triphenylbismutine and, subsequently, 5 g of Cereclor 70 were added, at a temperature of about 200° C., to 92 g of polypropylene, thus obtaining a material having an oxygen index = 24.5.

Analogously, by substituting triphenylbismutine by 3 g of triphenylstibine, a material having an oxygen index of 23.5 was obtained.

EXAMPLE 7

By operating according to example 1, 100 g of polypropylene were reacted with 1.75 g of $Sb(C_6H_5)Cl_2$.

After neutralization with NaOH, washing with water and drying as illustrated in aforesaid example, 102 g of product were obtained.

95 g of this product, after addition of 5 g of Cereclor 70, provided samples that exhibited an oxygen index comprised between 23 and 24.

What we claim is:

1. Self-extinguishing polyolefin compositions consisting of a mixture of:
   A. 100 parts by weight of a homopolymer of ethylene or of an alpha-olefin, or a copolymer of ethylene and an alpha-olefin;
   B. a flame-extinguishing agent which consists of the product obtained by reacting
      1. a compound having the general formula $MR_mX_n$, in which M is bismuth; R is selected from the group consisting of alkyl, cycloalkyl, aryl and alkaryl having up to 20 carbon atoms, and the group —$OR^1$ wherein $R^1$ has a molecular weight of up to 400 and is selected from the group consisting of hydrocarbon groups and hydrocarbon groups containing ether oxygen atoms; X is chlorine or bromine; m and n are zero or integers from 1 to 5, the sum $m + n$ being equal to the valency of M, and
      2. a compound selected from:
         a. a saturated or unsaturated hydrocarbon polymer, or a saturated or unsaturated non-polymeric hydrocarbon having more than 6 carbon atoms; and
         b. a polymeric or non-polymeric, partially halogenated, thermally unstable compound that decomposes when subjected to heating, resulting in the formation of the corresponding hydrogen halide;
   said flame extinguishing agent being present in such amount as to provide a metal content in the polymer of (A) ranging from 0.5 to 5% by weight; and
   C. 0 to 10 parts by weight of a partially chlorinated or brominated compound, said compound being thermally unstable and being capable of decomposing when subjected to heating, resulting in the formation of hydrochloric or hydrobromic acid.

2. A self-extinguishing composition according to Claim 1 wherein said flame-extinguishing agent includes bismuth trichloride.

3. A self-extinguishing composition according to claim 1 wherein said flame-extinguishing agent includes bismuth polyethylene glycolate.

4. A self-extinguishing composition according to claim 1 wherein said flame-extinguishing agent includes triphenyl-bismuthine.

5. Self-extinguishing polymetic compositions consisting of a mixture of:
   A. 100 parts by weight of predominantly isotatic polypropylene;
   B. a flame-extinguishing agent, consisting of the product obtained by reacting bismuth trichloride with predominantly isotactic polypropylene said flame-extinguishing agent being present in such an amount as to provide a bismuth content in the polymer of (A) of between 0.5 and 5% by weight; and
   C. 5 parts by weight of a chlorinated paraffin wax containing 40 to 75% by weight of chlorine.

6. Self-extinguishing polymeric compositions made up of a mixture of:
   A. predominantly isotatic polypropylene; and
   B. a flame extinguishing agent, consisting of the product obtained by reacting bisumuth trichloride with a chlorinated paraffin wax containing 40 to 75% by weight of chlorine, said flame extinguishing agent being present in such an amount as to provide a bismuth content in the polymer of A of between 0.5 and 5% by weight.

* * * * *

UNITED STATES PATENT AND TRADEMARK OFFICE
CERTIFICATE OF CORRECTION

PATENT NO. : 4,033,915
DATED : July 5, 1977
INVENTOR(S) : Guido Bertelli, Pierpaolo Roma and Paolo Longi It is certified that error appears in the above-identified patent and that said Letters Patent are hereby corrected as shown below:

In Col. 8, line 42, change "polymetic" to read -- polymeric --; on line 44, change "isotatic" to read -- isotactic --; on line 59, change "isotatic" to read -- isotactic --; on line 61, change "bisumuth" to read -- bismuth --.

Signed and Sealed this

Twenty-second Day of November 1977

[SEAL]

Attest:

RUTH C. MASON
Attesting Officer

LUTRELLE F. PARKER
Acting Commissioner of Patents and Trademarks